US009644633B2

(12) United States Patent
Laboube et al.

(10) Patent No.: US 9,644,633 B2
(45) Date of Patent: May 9, 2017

(54) CENTRIFUGAL MOTOR-COMPRESSOR UNIT

(75) Inventors: Pierre Laboube, Saint Sernin-du-Bois (FR); Patrick Friez, Le Creusot (FR); Jean-Marc Pugnet, Le Creusot (FR); Patrice Bonnefoi, Le Creusot (FR)

(73) Assignee: Thermodyn, Courbevoie (FR)

( * ) Notice: Subject to any disclaimer, the term of this patent is extended or adjusted under 35 U.S.C. 154(b) by 1515 days.

(21) Appl. No.: 10/552,237

(22) PCT Filed: Apr. 11, 2003

(86) PCT No.: PCT/FR03/01163
§ 371 (c)(1),
(2), (4) Date: Dec. 29, 2006

(87) PCT Pub. No.: WO2004/094833
PCT Pub. Date: Nov. 4, 2004

(65) Prior Publication Data
US 2007/0172363 A1 Jul. 26, 2007

(51) Int. Cl.
| F04D 25/06 | (2006.01) |
| F04D 29/58 | (2006.01) |
| F16C 37/00 | (2006.01) |
| F04D 17/12 | (2006.01) |
| F16C 32/04 | (2006.01) |

(52) U.S. Cl.
CPC ....... *F04D 25/0606* (2013.01); *F04D 17/122* (2013.01); *F04D 29/584* (2013.01); *F16C 32/0461* (2013.01); *F16C 37/005* (2013.01); *F16C 32/0489* (2013.01)

(58) Field of Classification Search
CPC .. F04D 25/06; F04D 25/0606; F04D 25/0686; F04D 29/058
USPC ....... 417/366, 369, 370, 423.8, 423.12, 423, 417/14
See application file for complete search history.

(56) References Cited

U.S. PATENT DOCUMENTS

| 3,942,908 | A | * | 3/1976 | Pilarczyk | 415/199.2 |
| 4,969,803 | A | * | 11/1990 | Turanskyj | 417/247 |
| 5,980,218 | A | * | 11/1999 | Takahashi et al. | 417/243 |
| 6,068,455 | A | * | 5/2000 | Cowans | F04D 29/5893 417/357 |

(Continued)

*Primary Examiner* — Patrick Hamo
(74) *Attorney, Agent, or Firm* — Meyertons, Hood, Kivlin, Kowert & Goetzel, P.C.

(57) ABSTRACT

A centrifugal compressor unit includes a driving means for rotatably driving a rotor, and at least one compressor including a statoric body and an arrangement of blade wheels mounted on a shaft which is rotatably driven by the rotor in the statoric body. The group formed by the motor and/or each compressor being mounted in a common housing is sealed from the gas used by the compressor. The compressor unit also includes an arrangement of active bearings for axially and radially guiding the rotor and the driven shaft, and a means for cooling the driving means and the guiding bearings by withdrawing the gas used by the compressor at the outlet of a first compression stage. The cooling means includes a set of internal conduits for supplying the driving means and the bearings with cooling gas. The cooling gas flow in the motor and the cooling gas flow in the bearing is separated and then converge upstream of the first compression stage.

16 Claims, 4 Drawing Sheets

(56) References Cited

U.S. PATENT DOCUMENTS 6,464,469 B1 * 10/2002 Grob et al. .................. 417/251
7,144,226 B2 * 12/2006 Pugnet et al. ............... 417/244

* cited by examiner

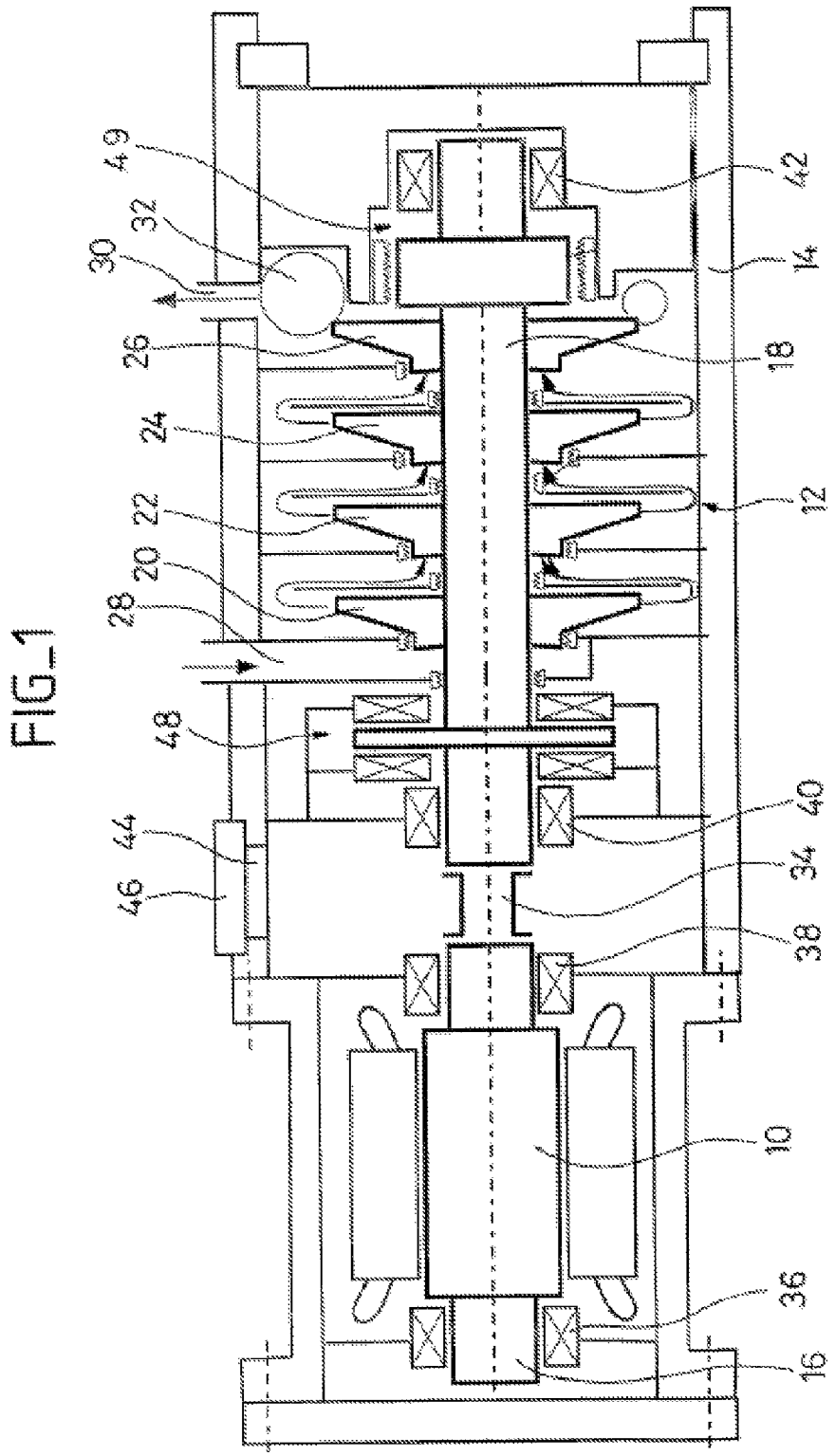
FIG_1 (PRIOR ART)

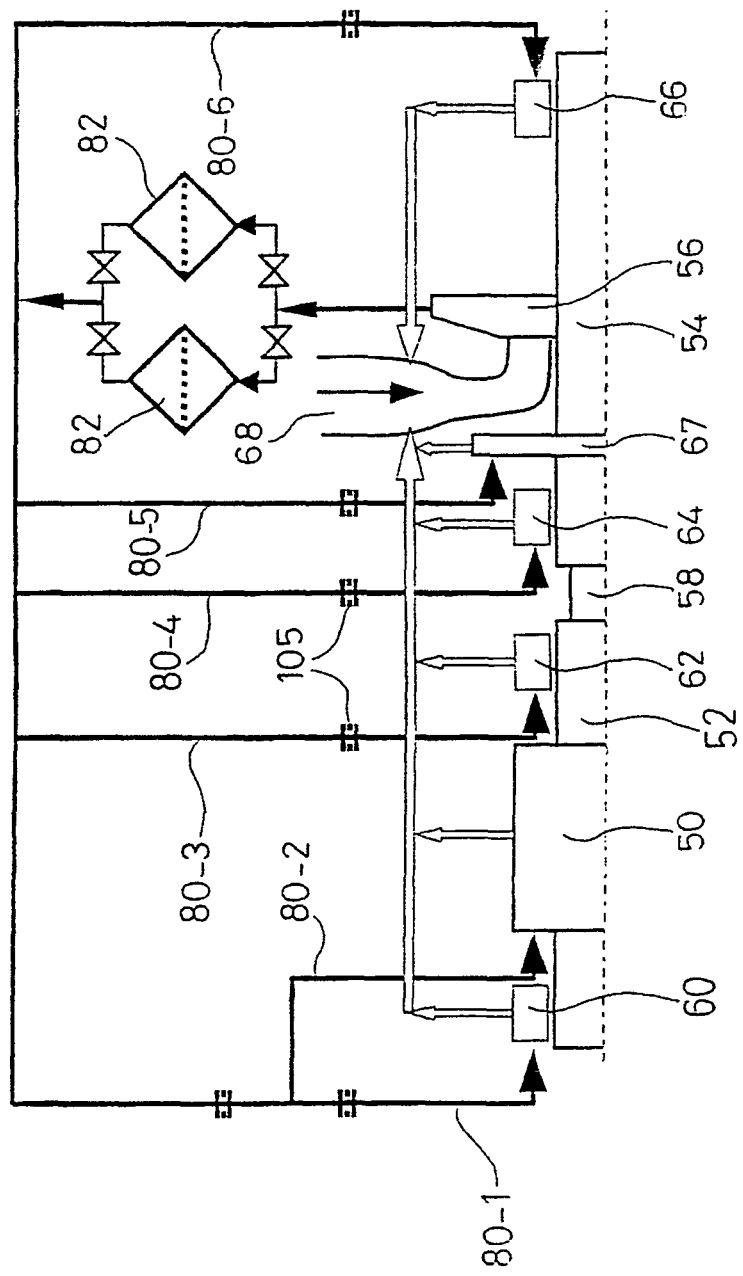
FIG_2

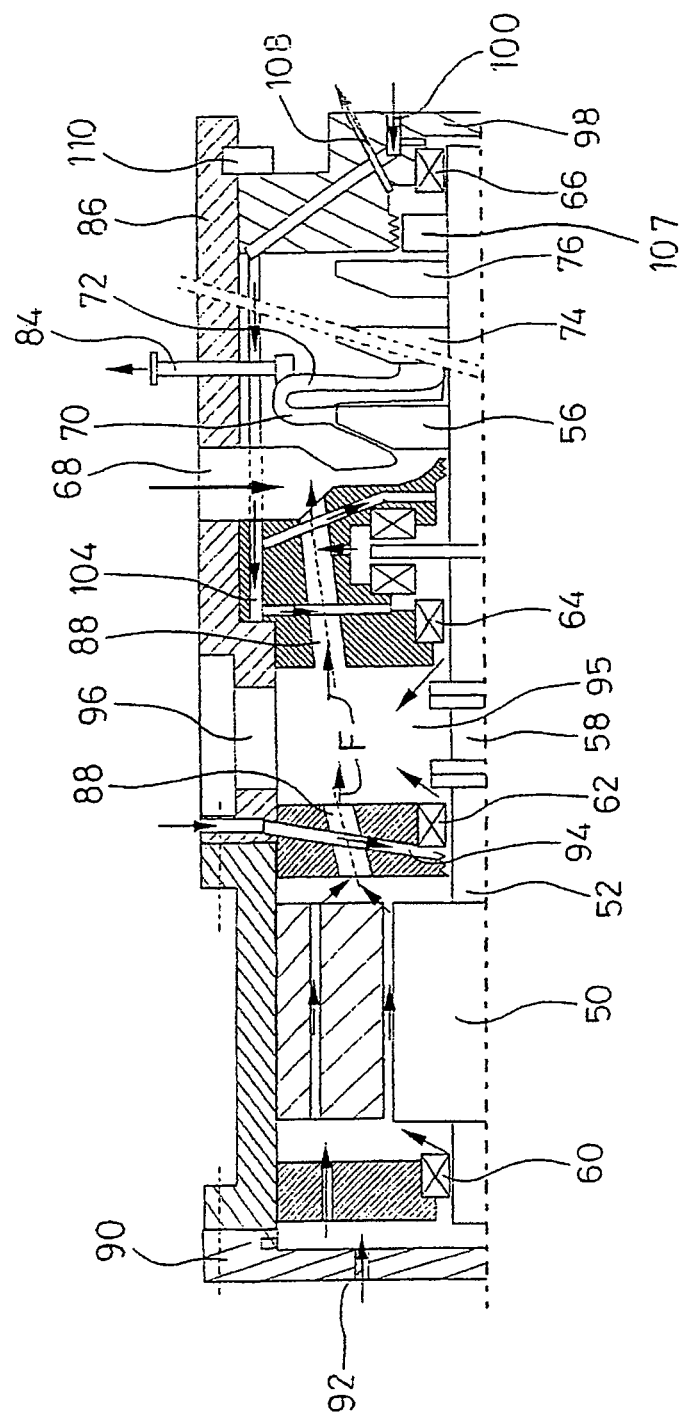
FIG_3

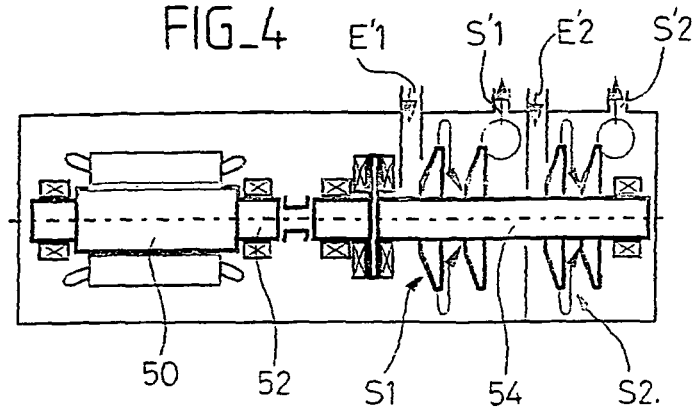
FIG_4
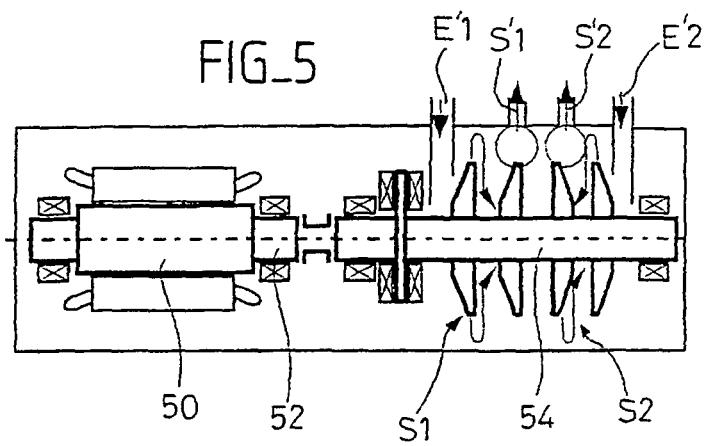
FIG_5
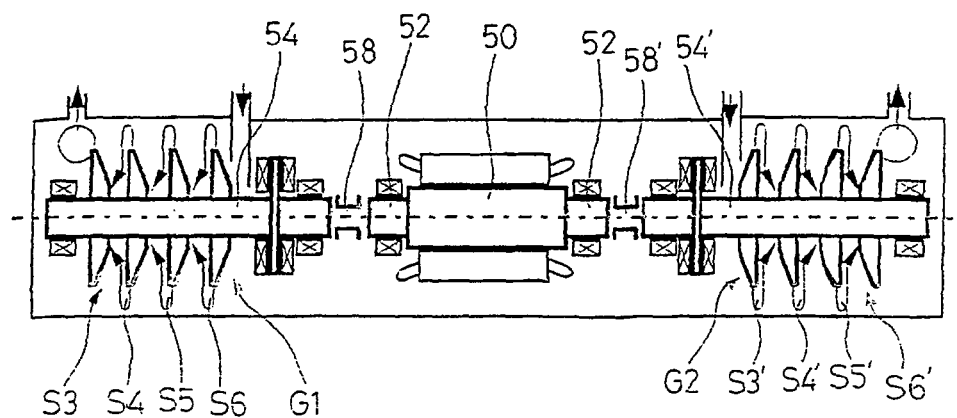
FIG_6

CENTRIFUGAL MOTOR-COMPRESSOR UNIT

BACKGROUND OF THE INVENTION

1. Field of the Invention

The invention relates to a centrifugal compressor unit. More specifically, the invention relates to a centrifugal compressor unit of the integrated type, that is to say of the type in which the compressor and a motor means for driving the compressor are mounted in a common housing sealed against the gas handled by the compressor.

2. Brief Description of the Related Art

With reference to FIG. 1, a conventional integrated compressor unit includes a motor means, generally including an electric drive motor 10 and a centrifugal compressor 12 including, for example, several compression stages, the entity being mounted in a common housing sealed against the gas handled by the compressor.

As can be seen in FIG. 1, the motor 10 rotationally drives a rotor 16 itself rotationally driving a driven shaft 18 supporting a set of compression impeller wheels 20, 22, 24 and 26.

In the example of a compressor unit illustrated in FIG. 1, the compressor includes four compression stages which together compress a gas taken in via an inlet pipe 28 to deliver it on the outlet side 30, passing via a volute casing 32.

The rotor 16 and the driven shaft 18 are connected via a flexible coupling 34. In this case, the rotor 16 and the driven shaft 18 are each supported by radial bearings 36, 38, 40, and 42. An opening 44 formed in the housing 14 and closed off by a blanking means 46 allows access to the flexible coupling 34 for assembling the compressor.

Finally, FIG. 1 shows that an axial thrust bearing 48 limits the axial displacement of the driven shaft 18, while an equalizing piston 49 allows the axial pressure applied to the driven shaft while the compression unit is in operation to be equalized.

Producing a compressor unit in the form of a motor and of a compressor which are located in a pressurized sealed common housing makes it possible to eliminate sealing gaskets needed by the compressor. These are elements liable to compromise the reliability of the compressor unit and to be the source of gas leaks into the atmosphere. In this case, the motor is located actually within the gas handled by the compressor. In order to avoid an excessive increase in the mechanical losses of the motor as a result of ventilation, the motor is arranged in such a way that it is at the intake pressure of the compressor. Thus gas is circulated through the motor in order to remove the losses, that is to say in the stator in order to remove the losses through a Joule effect in the windings, and in the air gap between the rotor and the stator in order to remove the ventilation losses and the eddy current losses in the rotor.

This is why centrifugal compressor units are generally provided with means for cooling the motor means and the guide bearings by tapping off gas leaving the first compression stage in order to cool the motor and the bearings. In this respect, reference may be made to documents EP-A-1 069 313 and U.S. Pat. No. 6,390,789, which describe various types of motor-compressor units in which the motor and the bearings are cooled by tapping cooling gas from the outlet side of the first compression stage.

However, this type of cooling technique presents a certain number of major disadvantages, particularly it does not allow optimum cooling of the motor and of the bearings.

There is a need to alleviate this disadvantage and to provide a motor-compressor unit that exhibits improved cooling means.

SUMMARY OF THE INVENTION

A centrifugal compressor unit of the type includes a motor means rotationally driving a rotor and at least one compressor including a stator body and a set of impeller wheels which are mounted on a driven shaft rotationally driven by the rotor in the stator body, the entity including the motor and the or each compressor being mounted in a common housing sealed against the gas handled by the compressor unit, the compressor unit further including a set of active bearings for axially and radially guiding the rotor on the driven shaft and cooling means for cooling the motor means and the guide bearings by tapping off some of the gas handled by the compressor at the outlet from a first compression stage, passing said gas through the motor means and through the bearings and reinjecting the gas into the inlet side of the compressor.

In some embodiments of a centrifugal compressor unit, the cooling means includes a set of internal passages for feeding the motor means and the bearings with cooling gas. The flow of cooling gas in the motor means is separate from the flow of cooling gas in the bearings and converging upstream of the first compression stage.

It has been found that such an arrangement improves considerably the cooling within the compressor unit. Specifically, it has been found that the size of the air gap of the magnetic bearings compared with the size of the air gap of the motor detracts from cooling when the same flow is used to cool the bearings and the motor, by preventing the cooling gas from circulating correctly. What happens is that the motor generates greater losses than the bearings and therefore requires a higher flow rate. Likewise, the temperature of the cooling gas leaving the motor detracts from the cooling of the bearings when the flow of cooling gas leaving the motor is used to cool the bearings.

In some embodiments, the cooling means further includes a set of external lines collecting the gas on the outlet side of the first compression stage and feeding the internal passages in parallel.

In one embodiment, the internal passages for feeding the motor means are fed in parallel with the internal passages for feeding the bearings with cooling gas.

The cooling means are equipped with filtering means for filtering the gas handled by the compressor.

In certain embodiments of the compressor unit, with the driven shaft of the compressor supported by two end radial bearings, the cooling means includes an axial passage running from one bearing to the other and fed at one of its ends by the external lines, said axial passage globally running longitudinally and radially externally through the compressor. For example, the internal passages for feeding the bearings includes a set of directional passages directed radially externally in the compressor and each feeding one bearing.

In some embodiments, the motor is fed with cooling gas via an orifice formed in an end cover and in communication with an external line. The flow of cooling gas may be mixed with the flow of cooling gas leaving the bearings cooled by the gas coming from the internal passages. For example, the motor-compressor unit includes means for regulating the refrigeration flow rate for the motor on the one hand and for each bearing on the other.

In some embodiments, the compressor unit includes means for collecting flows of cooling gas from members situated on the same side as an equalizing piston.

BRIEF DESCRIPTION OF THE DRAWINGS

Other objects, features and advantages of the invention will become apparent from reading the following description, given solely by way of a nonlimiting example and made with reference to the attached drawings in which:

FIG. 1 illustrates an embodiment of the overall structure of a conventional integrated motor-compressor unit;

FIG. 2 is a block diagram of an embodiment of a centrifugal compressor unit;

FIG. 3 illustrates one embodiment of a centrifugal compressor unit;

FIG. 4 illustrates one embodiment of a compressor unit;

FIG. 5 illustrates another embodiment of a compressor unit; and

FIG. 6 illustrates an embodiment of a compressor unit.

DETAILED DESCRIPTION OF EMBODIMENTS

FIG. 2 depicts just one compression stage for reasons of clarity, the other compression stages not having been depicted. It will, however, be appreciated that it may be provided with any number of compression stages, as will be discussed later with reference to FIGS. 3 to 6.

The compressor unit illustrated in this FIG. 2 includes a motor means 50, consisting for example of a variable high-speed electric motor rotationally driving a rotor 52, itself driving, at the same speed, a driven shaft 54 on which an impeller wheel 56 is mounted. The rotor 52 and the driven shaft 56 are connected via a flexible coupling 58. As a result, the rotor 52 and the driven shaft 54 are each supported by two end radial bearings 60, 62 and 64, 66, respectively. A thrust bearing 67 limits the axial displacement of the rotor 54 when the compressor is in operation, this displacement being caused by the appearance of axial forces that are due to the appearance of a differential pressure across the impeller wheel 56.

The impeller wheel 56 draws in a compressed gas delivered from an intake pipe 68 to increase its static pressure and thus increase its kinetic energy. A diffuser 70 (FIG. 3) slow the gas coming from the impeller wheel 56 to increase its pressure. Downstream, a return duct 72 leads the gas towards compression stages 74, . . . 76 located downstream.

As shown in FIGS. 2 and 3, in order to cool the motor 50 and the bearings 60, 62, 64 and 66 and the thrust bearing 67 that limits the axial displacement of the rotor 50, some of the gas leaving the first compression stage 56 is tapped off and used as a cooling gas. These various elements, such as the motor, the bearings and the thrust bearing are cooled using separate flows of cooling gas. Flows in parallel are delivered by passages 80-1, 80-2, . . . , 80-6 forming part of a set of external lines collecting the gas leaving the first compression stage 56, after passing through a set of filter cartridges such as 82. As will be appreciated, this arrangement, whereby the motor, on the one hand, and the bearings, on the other, are fed in parallel with separate cooling flows, makes it possible to get around the constraints associated with the size of the air gap of the magnetic bearings, on the one hand, and of the motor, on the other.

As can be seen in FIG. 3, according to one embodiment, the stator part of the compressor includes a tubing 84 collecting the fluid leaving the diffuser 70. The tubing passes through the casing 86 of the compressor. For actually cooling the motor and the bearings, the motor-compressor unit includes a set of internal feed ducts fed respectively from the external pipes 80-1, . . . , 80-6. Having passed through the motor and the bearings, the cooling gas is collected by a generally longitudinal central duct 88 which opens into the intake pipe 68 upstream of the first compression stage 56.

To cool the motor 50 and the end bearings 60 and 62 supporting the rotor 52, the corresponding end cover 90 closing the casing 86 is provided with an orifice 92 which communicates with the corresponding external pipe 80-1. Part of this cooling flow is used to cool the bearing 60. This flow is then collected for cooling the motor, by passing it through the motor air gap. Another part of this flow is used directly to cool the motor. A second internal passage 94 is fed from the external lines to cool the second bearing 62 of the motor. Downstream, the flow of cooling gas used to cool the bearings 60 and 62 and the motor 50 is collected in a cavity 95 in which the flexible coupling 58 is located and which is closed off by sealed blanking means 96. Downstream, as depicted by the arrows F, the gas is collected by the internal passage 88 to be reinjected upstream of the first compression stage 56.

Furthermore, in some embodiments, the bearings and the thrust bearing are cooled using a flow of cooling gas delivered through an end cover 98 blanking off the corresponding end of the casing 86. In FIG. 3, cover 98 is provided with an orifice 100 which communicates with a corresponding external pipe 80-6. This flow of cooling gas cools, on the one hand, the end bearing 66 situated at the same end as this cover 98 and the opposite-end end bearing 64, via an axial pipe 104 which runs longitudinally and radially externally between these bearings 64 and 66, through the compressor stator elements. This axial pipe is also shaped in such a way as also to cool the thrust bearing 78. The flow of gas is therefore reinjected into the passage 88. In some embodiments, withdrawing cooling gas on the outlet side of the first compression stage makes it possible to tap off gas that is not as hot as it would have been had it been taken from the outlet side of the compressor, making the cooling more effective, while at the same time limiting the compression power that has to be developed in order to raise the pressure of this gas. In addition, this tapping represents an autonomous feed once the motor has been started, means 105 for adjusting the cooling flow rate for the motor, on the one hand, and for each of the bearings, on the other, being provided so as to create appropriate and controlled pressure drops in the external lines. These adjusting means may be active, of the regulating valve type, or passive, of the fixed orifice type.

In the embodiment illustrated in FIG. 3, the intake of gas into the compressor is situated on the electric motor side. The aforementioned cooling principle may also be applied to an arrangement in which the delivery side of the compressor is on the motor side. In this case, it is the flow of cooling gas leaving the motor or, in general, leaving components situated on the same side as the equalizing piston 107, which is mixed with the flow of gas from this equalizing piston 107 to then be injected into the intake pipe 86 via an equalizing line 108.

For maintenance, in an embodiment, the sealed blanking means 96 allows access to the flexible coupling 58. Extracting the rotor from the motor is, for its part, done by removing the end cover 90, which for example is bolted on to the casing. Removal of the internal part of the compressor is, for its part, done by extracting the corresponding cover 98, which for example is fixed to the casing by a shear ring 110.

In an embodiment, the entity is arranged in such a way that the rotor-diaphragms assembly, that is to say the entirety of the compressor, can be withdrawn from the casing at the same time as the cover 98 without having to detach the casing from its baseplate and from the process gas pipework and the cooling lines. It will be noted that, during these assembly-disassembly phases, the rotors rest on their bearing, which makes the coupling and uncoupling operations easier, without the risk of damaging the rotating parts and the stator parts which might otherwise come into contact with the rotors during these operations.

It will be noted that the invention is not restricted to the embodiments described. Specifically, whereas FIGS. 2 and 3 depict a centrifugal compressor unit equipped with a multi-stage compressor incorporated in-line with a single compression section having multiple stages, the invention also applies to other types of compressor unit, for example those having two in-line sections S1 and S2, for example each including two stages, each compressing a process gas, as depicted in FIGS. 4 and 5. In the embodiment depicted in FIG. 4, two inlets E'1 and E'2 and two outlets S'1 and S'2 are provided in the casing such that the inlet E'2 of the second section is near the outlet S'1 of the first section. Thus, in this case, as can be seen in FIG. 4, the first compression stage of one of the sections S2 is located facing the second compression stage of the other section S1. By contrast, as in FIG. 5, for a configuration known by the name "back-to-back", the first compression stages of each of the sections S1 and S2 may be placed side by side. In this case, the outlets S'1 and S'2 of these compression stages are located side by side and the inlets E'1 and E'2 are located at opposite ends from one another. In FIG. 6, that the invention also applies to an arrangement in which use is made, arranged in a common casing, of a motor 50 and two compressor units G1 and G2 each provided with respective compression stages S3, S4, S5 and S6 and S'3, S'4, S'5 and S'6 each mounted on a respective driven shaft 54 and 54', these shafts being fixed at two mutually opposed ends of the rotor 52 using flexible couplings 58 and 58'. Of course, this arrangement with two compression units may use any arrangement, such as either one of the arrangements described hereinabove with reference to FIGS. 4 and 5.

In these various embodiments, use is made of means for cooling the motor and the bearings that use parallel flows of cooling gas. As will be appreciated, separate fluids for cooling the motor and the bearings are not required. Furthermore, the electric motor, the bearings and the magnetic thrust bearing are cooled autonomously with the flow rate needed for each distributed to each, these various flows then being collected to be reinjected into the inlet side of the first compression stage. These features make it possible to minimize the size of the machine and to simplify the installation. Furthermore, producing internal passages makes it possible to limit the space required for the external lines.

In some embodiments, it is possible to limit gas leaks to the outside. The reliability is also improved in that integrated filtration of the motor cooling gas. Furthermore, the use of several filter cartridges arranged in parallel and associated with a set of valves allows these cartridges to be changed during running.

In the description given hereinabove, the filtering means are produced in the form of cartridges mounted on the external pipes, however, it is equally possible, as a variant, to mount the cartridges within the compressor unit housing, at a location that makes them readily accessible, in this instance, for example, in the cavity 95 that provides access to the coupling, preferably mounting them on the blanking means.

The invention claimed is:

1. A centrifugal compressor unit comprising:
a motor means rotationally driving a rotor; and
at least one compressor comprising:
   a stator body; and
   a set of impeller wheels which are mounted on a driven shaft rotationally driven by the rotor in the stator body;
   wherein the motor and the at least one compressor is mounted in a common housing sealed against the gas handled by the compressor unit;
a set of active bearings for axially and radially guiding the rotor and the driven shaft; and
cooling means for cooling the motor means and the guide bearings by tapping off some of the gas handled by the compressor at an outlet from a first compression stage, passing the gas through the motor means and through the bearings and reinjecting the gas into an inlet side of one of the at least one compressor, wherein the cooling means are equipped with filtering means for filtering the gas handled by the compressor, wherein the cooling means comprises a set of internal passages for feeding the motor means and the bearings with cooling gas which are formed in the compressor unit, and wherein the flow of cooling gas in the motor means is separate from the flow of cooling gas in the bearings, and wherein the flow of cooling gas converges upstream of the first compression stage.

2. The centrifugal compressor unit of claim 1, wherein the cooling means further comprises a set of external lines collecting the gas on the outlet side of the first compression stage and feeding the internal passages in parallel.

3. The centrifugal compressor unit of claim 2, wherein the internal passages for feeding the motor means are fed in parallel with the internal passages for feeding the bearings with cooling gas.

4. The centrifugal compressor unit of claim 1, wherein, with the driven shaft of the compressor supported by two end radial bearings, the cooling means comprise an axial passage running from one bearing to the other and fed at one of its ends by the external lines, and wherein the axial passage globally running longitudinally and radially externally through the compressor.

5. The centrifugal compressor unit of claim 1, wherein the internal passages for feeding the bearings comprise a set of directional passages directed radially externally in the compressor, and wherein each internal passage feeds one bearing.

6. The centrifugal compressor unit of claim 1, wherein the motor is fed with cooling gas via an orifice formed in an end cover and in communication with an external line.

7. The centrifugal compressor unit of claim 1, wherein the internal passages for feeding the bearings comprise a set of directional passages directed radially externally in the compressor, and wherein each internal passage feeds one bearing, and wherein the motor is fed with cooling gas via an orifice formed in an end cover and in communication with an external line, and wherein the flow of cooling gas is mixed with the flow of cooling gas leaving the bearings cooled by the gas coming from the internal passages.

8. The centrifugal compressor unit of claim 1, further comprising means for regulating a refrigeration flow rate for the motor and for each bearing.

9. The centrifugal compressor unit of claim 1, further comprising means for collecting flows of cooling gas from members situated on a same side as an equalizing piston.

10. The centrifugal compressor unit of claim 2, wherein the external lines are equipped with filtering means for filtering the gas handled by the compressor.

11. The centrifugal compressor unit of claim 10, wherein, with the driven shaft of the compressor supported by two end radial bearings, the cooling means comprise an axial passage running from one bearing to the other and fed at one of its ends by the external lines, and wherein the axial passage globally running longitudinally and radially externally through the compressor.

12. The centrifugal compressor unit of claim 11, wherein the internal passages for feeding the bearings comprise a set of directional passages directed radially externally in the compressor, and wherein each internal passage feeds one bearing.

13. The centrifugal compressor unit of claim 12, wherein the motor is fed with cooling gas via an orifice formed in an end cover and in communication with an external line.

14. The centrifugal compressor unit of claim 13, wherein the flow of cooling gas is mixed with the flow of cooling gas leaving the bearings cooled by the gas coming from the internal passages.

15. The centrifugal compressor unit of claim 10, further comprising means for regulating a refrigeration flow rate for the motor and for each bearing.

16. The centrifugal compressor unit of claim 10, further comprising means for collecting flows of cooling gas from members situated on a same side as an equalizing piston.

\* \* \* \* \*